April 27, 1943.    R. W. ROWEN    2,317,941
INCINERATION OF LIQUID SLUDGE OR THE LIKE
Filed March 24, 1941
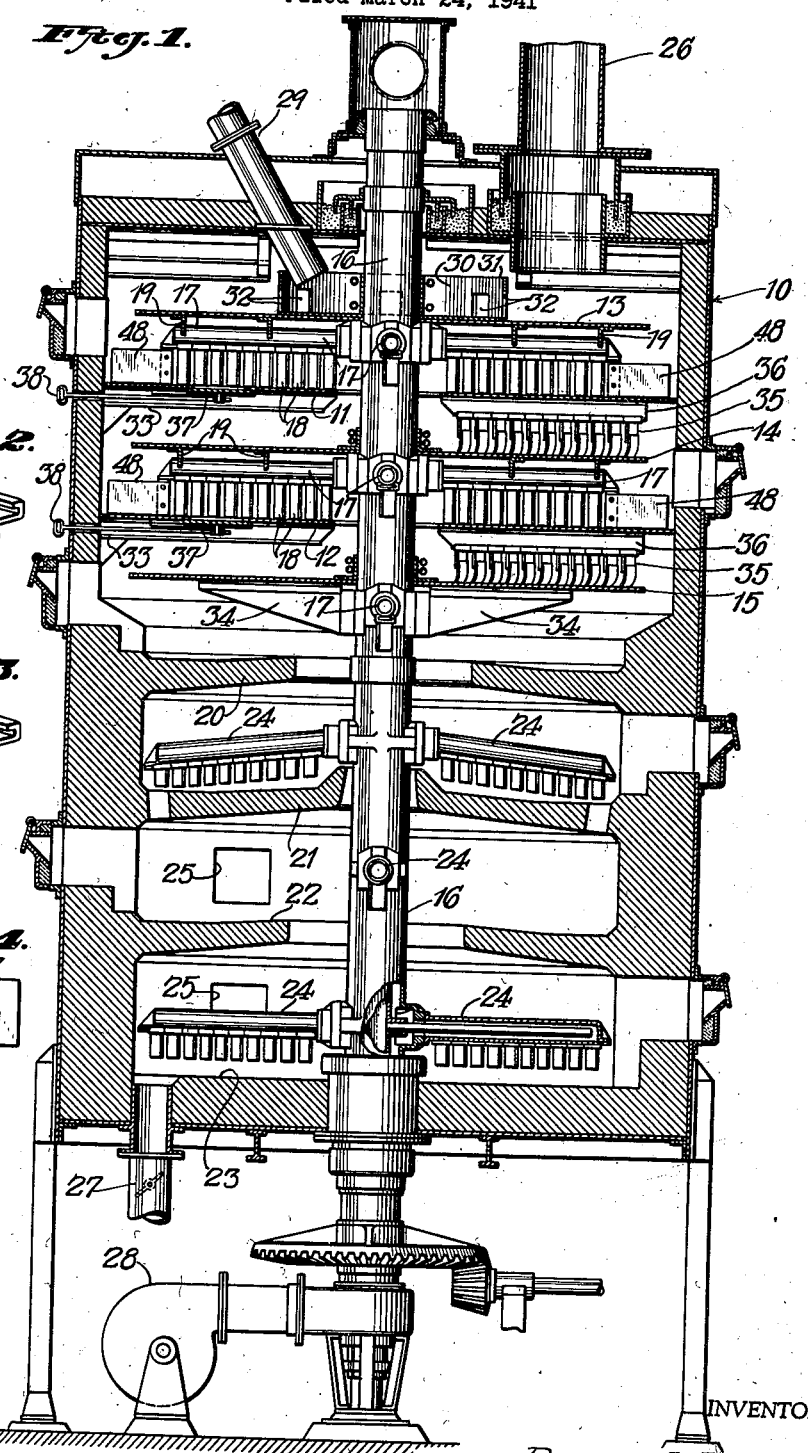
INVENTOR.
ROBERT W. ROWEN.
BY Ward, Crosby & Neal
ATTORNEYS Patented Apr. 27, 1943

2,317,941

UNITED STATES PATENT OFFICE 2,317,941

INCINERATION OF LIQUID SLUDGE OR THE LIKE

Robert W. Rowen, Great Neck, N. Y., assignor to Nichols Engineering & Research Corporation, New York, N. Y., a corporation of Delaware Application March 24, 1941, Serial No. 384,909

4 Claims. (Cl. 110—12)

This invention relates to improved furnace constructions particularly adapted among other uses for drying and incinerating liquid or semi-liquid sewage sludge or the like waste materials, including ground garbage or other combustible wastes.

Formerly it has been the practice to partially dewater liquid and semi-liquid sludges and wastes before drying or incinerating the same, by filtration on vacuum filters or by the use of centrifuges. This has necessitated the installation of expensive equipment, and the high cost of operation of these dewatering devices has been in some cases a decided disadvantage. Also generally large quantities of expensive chemicals have been required to condition sludges prior to filtration, and this further required technical skill by plant operators in adding these chemicals to the sludge in the correct proportions.

In order to dry or incinerate liquid and semi-liquid sludges by the application of heat, it is of importance that the gases and vapors leave the drying or incinerating apparatus at relatively low temperatures in order that the process may be economical, yet obnoxious odors must not be generated during the process. Formerly it has generally been considered necessary to raise the temperature of all gases from the drying and incinerating zones to a high degree in order to destroy obnoxious odors thereof. It has also usually been considered economically necessary to install heat exchanging equipment for partial recovery of the heat of the very hot waste gases leaving the incinerator, but this has incurred a great expense for heat exchangers, fans and ducts, as well as high maintenance costs.

The present invention involves a novel, inexpensive multiple superposed hearth furnace construction embodying improved means for so introducing and distributing the liquid sludge and controlling its flow, travel and heating in the furnace, that the above indicated problems are overcome.

Constructions embodying this invention may utilize certain features of the invention disclosed in the copending application of Mark B. Owen, Ser. No. 379,964, filed February 21, 1941, and also various features of the present invention may if desired, be incorporated in the furnace structure of said Owen application.

Various further and more specific objects, features and advantages of the invention will appear from the description given below taken with the accompanying drawing illustrating by way of example certain preferred forms of the invention.

The invention consists in such novel features and combinations of parts as may be shown and described in connection with the apparatus herein disclosed.

In the drawing

Fig. 1 is a vertical cross-sectional view of one form of furnace embodying the invention; and Figs. 2, 3 and 4 illustrate various alternative forms of rabbling teeth which may be used in the furnace of Fig. 1.

Referring to Fig. 1 in further detail, the superposed multiple hearth furnace 10 as here shown may include within its upper portion a plurality of stationary warming or drying hearths as at 11 and 12 alternating with a plurality of rotatable warming or drying hearths as at 13, 14 and 15. These rotatable hearths may as shown be carried by a central rotatable shaft 16. This shaft may also be utilized for carrying a plurality of rabble arms as at 17 having rabbling teeth as at 18 for cooperating with each of the stationary hearths. In the particular construction shown, the peripheral portions at least of the rotatable hearths 13, 14, 15 may be further supported as by brackets 19 mounted upon the rabble arms.

The lower portion of the furnace may include a plurality of stationary incinerating hearths as at 20, 21, 22, 23. These hearths may be constructed of refractory material in a manner well known with multiple hearth furnaces and may be accompanied by rabble arms as at 24 mounted on the shaft 16 cooperating with the hearths in a well-known manner.

The furnace may be heated by inserting fuel or fluid fuel burners through openings as at 25 at one or more of the lower hearth spaces. Alternate hearths respectively of the furnace may be constructed or arranged to provide central and peripheral discharge ports or spaces, and the rabble teeth may be directed at proper angles at the various hearths so that the material under treatment is rabbled or advanced inwardly and outwardly respectively over alternate hearths, to fall through the ports from each hearth to the next, in its progress down through the furnace. At the same time the discharge ports and spaces permit air and evolved gases to follow paths countercurrent to the material over each of the hearths and through the discharge ports or spaces upwardly through the furnace to an outlet duct as at 26. A discharge outlet 27 for the ash or other non-combustible material may be provided at the lower hearth.

The central shaft and rabble arms may be provided as shown, in a well-known way, with internal cooling fluid conduits supplied for example with air as from a fan 28 connected at the lower portion of the shaft 16.

The liquid or semi-liquid material to be treated may be introduced as through a pipe 29 extending through the roof structure of the furnace and discharging for example onto the upper rotatable hearth 13. A reservoir or cavity may be provided as at 30 at the mid portion of this hearth to contain a considerable quantity of the material. This reservoir may be formed for example by an annular upstanding sheet metal wall 31 concentric with the shaft and having openings as at 32 at spaced points around its base for discharging and distributing the material more or less gradually in radial directions over the hearth 13. The reservoir 30 will tend to evenly distribute the material over the hearth 13 even though somewhat irregular quantities of the material may flow in through the pipe 29. Also the reservoir 30, being mounted in the presence of hot gases rising from the lower portions of the furnace, will provide a means in which the material may be warmed to some extent before it is distributed as a thin layer over the hearth 13.

As shown, all of the warming and drying hearths in the upper portion of the furnace are preferably formed of relatively thin sheet material, such as sheet iron or other good conductive material, so that the heat of the hot gases will be readily transferred both to the bottom and top surfaces of the layers of material on these hearths. Each of the stationary sheet metal hearths may be carried upon a plurality of radially extending brackets as at 33, whereas as above indicated, the rotatable sheet metal hearths may be supported both by the shaft 16 and by the rabble arms.

In the construction shown, four of the rabble arms may be provided above each of the hearths 11 and 12, and these four arms will ordinarily provide sufficient supporting means for the rotatable hearths such as 13, 14. However, at each of the hearths further down in the furnace, it will ordinarily be unnecessary to provide more than two rabble arms over each hearth, because less frequent agitation will be required there. Hence for hearth 15, for example, the two rabble arms 17 may be supplemented by supporting brackets as at 34 for supporting this rotatable hearth.

The material on the hearth 13 being ordinarily in a freely flowing condition, will flow over this hearth and off its periphery without need for any rabbling means. However, it will be desirable to provide, as shown, rabbling means cooperating with all of the remaining hearths. For cooperating with each of the rotatable hearths, a plurality of radially extending rows of stationary rabble teeth as at 35 may be slidably mounted for example on small I-beams as at 36, (or on the I-beams which form parts of brackets 33) secured to the under side of stationary hearths 11 and 12. As shown, similar tooth supporting means may also be provided above hearth 13 in case the material treated is such as to require rabbling at this hearth.

Stationary hearths 11 and 12 in addition to their central discharge ports as shown, may be provided at various points with supplemental discharge ports controlled by slidable gates as at 37, manually operable by handle means 38 extending to the outside of the furnace walls. Such gate arrangements are shown and described in further detail in the above mentioned Owen application. In operating the furnace, if the temperatures at the middle of the furnace, or say at hearths 14, 12 or 15, should tend to become too high, thereby tending to scorch the surface portions of the sludge while the interior portions are still quite wet (with consequent danger of production of odors), then to reduce such temperatures, one or both of the adjustable gates 37 may be opened, or opened more widely, and thereby cooler sludge is introduced more directly onto the hearths below these gates, with the result that the region of highest temperatures in the furnace will move downwardly. On the other hand, if in the mid portions of the furnace it is found that the sludge is too moist for ready combustion when it reaches the incinerating hearths, or too moist for thorough combustion before leaving the furnace, then the adjustable gates may be moved to more nearly closed positions whereby more of the sludge will have to pass over more extended drying hearth areas before reaching the incinerating hearths. Consequently the sludge upon reaching the incinerating hearths will be drier and have a higher temperature and the region of highest temperatures will tend to rise in the furnace.

In these ways and in conjunction with the control of the fuel burners, the temperature conditions at the various hearths may be quite easily controlled to the extent necessary, depending upon the varying fuel content of the material being treated or the possibly variable rates at which it is introduced. The important advantages accruing from careful control of the temperatures at the various hearths will be apparent from explanations given below as to how the furnace may be operated economically and without danger of producing obnoxious odors.

The following table gives illustrative examples of suitable moisture contents of the material as it leaves each hearth, and temperatures obtainable at successive hearths (starting from the top of the furnace):

| Hearth | Per cent H₂O in sludge | Sludge temp., deg. F. | Gas temp., deg. F. |
| --- | --- | --- | --- |
| First | 90 | 140 | 300 |
| Second | 89.5 | 150 | 350 |
| Third | 88.5 | 155 | 400 |
| Fourth | 86.0 | 160 | 500 |
| Fifth | 80.0 | 160 | 600 |
| Sixth | 70.0 | 165 | 700 |
| Seventh | 50.0 | 170 | 750 |
| Eighth | 0.0 | 1,000 | 1,200 |
| Ninth | 0.0 | 1,200 | 1,400 |

In multiple hearth furnace constructions it has heretofore been the practice to mount the rabble teeth on the rabble arms in positions such that the lower edges of the teeth will be spaced with substantial clearance from the surfaces of the hearths. Such spacing of the hearths and rabble teeth according to common practice, is shown on the drawings at hearths 21 and 23. Such clearance permits a substantial bed of ash or other non-combustible material to accumulate on the hearths, protecting the hearths against wear and avoiding any danger that the teeth, even upon expansion or contraction of the furnace parts, will engage the hearth surfaces and cause jamming or breakage. However, in using this type of furnace, for drying and incineration of materials such as sewage sludge with which there is danger of producing obnoxious odors, I have found it to be sometimes undesirable to permit any such accumulations of the material on the upper hearths where the warming or drying actions take place. That is, if any such accumulations rest more or less permanently on the drying hearths without being agitated and rabbled, there is danger that heat from the hot gases will scorch the surface portions of such layers, either on the upper surfaces of the accumulated layers or on the under side where the material contacts with the hot sheet metal, and with the consequent production of obnoxious odors. There is particular danger that this will occur if the furnace is operated intermittently or when the incinerator is taken out of service and then again warmed up preparatory to restarting operations. Where this difficulty is encountered, it may be overcome by providing rabble teeth so mounted or constructed that their lower edges will yieldably engage the surfaces of the hearths or act thereon as squeegees so as to clean all the material from the path of each tooth at frequent intervals, and advance such material into the paths of the next succeeding teeth. Thus as soon as a thin layer of the sludge is warmed or heated on the surface of the sheet metal hearths, it may be agitated and replaced by cooler material with freshly exposed moist surfaces, without danger that any portion of the material will remain with its surfaces in one place on a hearth long enough to permit scorching at any of the drying hearths. Also in this way the layers of sludge on each of the drying hearths in effect have both their upper and lower surfaces periodically agitated and changed by the rabble teeth for fresh exposure of the particles of material to the high temperature gases flowing both over the hearths and in contact with the under sides of the hearts.

Various forms of rabble teeth suitable for the above indicated purposes of yieldingly engaging the hearth surfaces are shown in Figs. 2-4. The construction of Fig. 2 may comprise a portion as at 40 shaped to slidably engage a rabble arm or support in the usual way. The depending active portion of this tooth as at 41 may be formed for example of flexible thin sheet metal or other material bent to a shape as shown, and suitably affixed as by riveting to the portion 40. In the form shown in Fig. 3, the attaching portion 42 may be similar to the portion 40 above referred to, but formed for example integral with a depending tooth portion 43 at the proper angle, and adapted to have bolted or riveted thereon, a replaceable flexible portion 44. This latter portion if desired may be formed of flexible fabricated material such for example as various of the temperature-resistant materials used for brake lining purposes, suitable woven wire or wire brush material.

In Fig. 4 another tooth construction 45 adapted for similar purposes is shown. In this case the entire tooth may be of a rigid construction, but so mounted that the weight of the tooth will cause the lower edge to yieldably engage the hearth. For this type of tooth, the tooth-attaching portions of the rabble arms may be circular as indicated at 46, and the tooth may be formed with an apertured lug as at 47 for loosely embracing the arm portion 46. When the rabble arm is moved in the direction indicated by the arrow in Fig. 4, the teeth of this type will trail the arm with their lower edges in scraping contact with the hearth surface. But if the tooth should meet with any obstacle on the hearth, it will be free to pivot about the arm portion 46 and thus rise over the obstacle without danger of breakage.

Portions of the hearths which may not be approached by the usual arrangements of the rabble teeth, for example the peripheral portions of hearths 11 and 12, may be periodically scraped clean as by attaching suitable flexible members as at 48 to the ends of rabble arms 17 as shown.

The manner in which this type of furnace may be operated according to the invention, economically without production of obnoxious gases will now be explained. The liquid sludge or waste material as first introduced may have a moisture content of from 75-95%, and a temperature for example of 60° F. The gases arising from the incinerator portions of the furnace having been evolved or heated at the lower hearths to a high temperature, will be free of odors and when they arrive at the top of the furnace, they will contact with the sludge being admitted and their first effect at the top hearth 13 will be that of gradually warming the sludge up to the dew point temperature of the gases. Until the sludge reaches the dew point temperature, there is actually a condensation of moisture from the hot gases on the cool sludge and consequently noxious gases (volatiles) cannot be evolved from the sludge at this region, and in fact not even steam or vapors can be evolved from the sludge at this region. The sludge is, however, with the close spacing of the numerous sheet metal drying hearths as shown, absorbing a great amount of heat from the gases and is therefore cooling the gases so that their exit temperature will be low and heat losses to the stack will be minimized. Further on, when the sludge reaches the dew point temperature of the gases, moisture starts to evaporate from the sludge. The evaporation of moisture not only absorbs heat from the gases, but heat for evaporation is also absorbed from the sludge mass itself (a parallel illustration is the cooling effect of evaporation of water from wet hands). Thus so long as the sludge still contains enough moisture, it is impossible for the sludge to become overheated to the point where obnoxious volatiles will be evolved therefrom or so that it will scorch or smolder with the production of obnoxious odors. Typical temperature measurements of this sludge itself on the drying hearths, show temperatures for example in the neighborhood of 160° F. even though the gases above such sludge may be at 1000° F. or higher. Various tests show that so long as the sludge temperature is kept below about 190° F. at least, while drying, no appreciable amount of volatiles can be driven off, no matter how dry the sludge. It should be noted further that all of the material on the warming and drying hearths is either constantly flowing, or all parts of it are frequently being agitated by the rabble teeth, thus exposing fresh surfaces and mixing the sludge, and hence keeping the temperature of the various particles substantially uniform at each zone. Therefore "case hardening" of the sludge surfaces and consequent scorching thereof does not take place.

When the sludge does become dry enough so that there is no longer enough moisture present to protect against overheating and scorching, then the sludge may rather quickly become warm enough so that hydrocarbons giving rise to odors are driven out. But this does not occur until the sludge has been dried to a moisture content varying from 30 to 50%, and by this time, in the furnace shown, the sludge has been rabbled down onto the refractory hearths. At this region the gases volatilized from the sludge are ignited by the hot gases ascending from the lowermost incinerating hearth. And since these gases are thus burned at high temperatures, they are effectively deodorized. In this zone of the incinerator, which is usually at the next to the lowermost hearth, these volatilized gases burn with long yellow hot flames and ignition and deodorization is positive. On the lowermost hearth the solids in the sludge itself, principally fixed carbon, are burned before discharge from the incinerator.

I have thus found it possible to dry and incinerate liquid and semi-liquid sludges containing from 75-95% moisture for example, without production of obnoxious odors and with waste gases leaving the incinerator at relatively low temperatures of from 200-500° F., whereas heretofore it had been generally assumed that the waste gases would have to be heated to 1000° F. or higher to avoid odors.

In the construction shown it will be noted that numerous sheet metal drying hearths are spaced vertically at distances approximately one-half or less, as compared with the spacing of the refractory incineration hearths. Such a spacing of the hearths has a number of important advantages rendering the furnace particularly applicable for treating liquid or semi-liquid material in the way above explained. At the incineration hearths, ample space is provided between hearths for considerable masses of the solid material, and to provide sufficient space for thorough combustion of the evolved gases at high temperatures and relatively low gas velocities. On the other hand, close spacing of the drying hearths not only permits a much greater total hearth area within a given size of furnace, to economically provide large warming and drying areas, but also a close spacing at these hearths will cause the streams of hot gases to flow more rapidly thereover and thus carry away the moisture more rapidly. The closer spacing of the sheet metal drying hearths also insures more intimate contact of the streams of gases with both the under surfaces of these hearths and the material resting on the upper surfaces thereof, thus increasing the exposure of both the upper and under surfaces of the material to heat. Since combustion does not take place at the drying hearths, there is no need of providing any large spaces to insure thorough combustion of the gases at these areas, and since the material is in liquid or semi-liquid form on a number of the warming or drying hearths, it is consequently present only in thin layers requiring less space than the solid material at the incinerating hearths. It will be apparent that the use of sheet metal for the drying hearths, rather than the refractory brick necessary for the burning hearths, makes possible closer spacing of the drying hearths in several ways. That is, the metal hearths may be thinner and need not be arched as must refractory brick hearths. Also use of metal hearths facilitates direct attachment of rabbles to their lower sides, thus enabling the use of alternate rotatable hearths, and enabling the latter in turn to be supported by rotatable rabbles, all with a great saving of space vertically.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Apparatus for drying and incinerating liquid or semi-liquid sludge material, comprising a plurality of superposed stationary drying hearths of metal, a plurality of lower superposed burning hearths of refractory material, said hearths being arranged with generally similar spacings vertically within enclosing furnace walls, a rotatable central shaft carrying rabbling means for agitating and advancing the sludge over said hearths and from hearth to hearth down through the furnace, a plurality of superposed rotatable drying hearths of metal, mounted on said shaft in positions alternating with said stationary drying hearths and supported by certain of said rabbling means, and stationary rabbling means secured to the under sides of said stationary drying hearths for rabbling and advancing the sludge on said rotatable hearths, all of said hearths being constructed and arranged to provide ports permitting air and evolved gases to pass alternately inwardly and outwardly of succeeding hearths and upwardly through the furnace countercurrent to the travel of the sludge.

2. Apparatus for drying liquid or semi-liquid sludge material, comprising a plurality of superposed stationary drying hearths of metal, a rotatable central shaft carrying rabbling arms with teeth for agitating and advancing the material inwardly over and then from each of said hearths, and a plurality of rotating hearths of metal, mounted upon said rabble arms at positions alternating with said stationary hearths, and rabbling means comprising beams and teeth carried by the beams, secured to the under sides of the stationary hearths for agitating and advancing the material outwardly over and then from each of said rotatable hearths onto the stationary hearths.

3. A furnace construction comprising a plurality of generally circular superposed hearths of sheet metal, rabbling means for agitating and advancing material over said hearths, including a rotatable central shaft carrying rabble arms extending over said hearths, and a row of separable teeth carried by each of said arms, the lower edge portions of each of said teeth being constructed and arranged to yieldably engage an annular area of a hearth as squeegees for cleaning the path engaged and advancing the material from such path to the path of the next succeeding tooth of the row.

4. A furnace construction including a generally circular hearth, and a series of rabble teeth mounted over said hearth and movable arcuately in respect thereto, at least the lower edge portions of said teeth being formed of flexible sheet material and normally pressing against said hearth.

ROBERT W. ROWEN.